(12) United States Patent
Pettersson

(10) Patent No.: US 8,929,354 B2
(45) Date of Patent: Jan. 6, 2015

(54) SCHEDULING OF A COMMUNICATION BASE STATION

(75) Inventor: Jonas Pettersson, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 329 days.

(21) Appl. No.: 13/574,114

(22) PCT Filed: Nov. 3, 2011

(86) PCT No.: PCT/SE2011/051313
§ 371 (c)(1),
(2), (4) Date: Jul. 19, 2012

(87) PCT Pub. No.: WO2013/051976
PCT Pub. Date: Apr. 11, 2013

(65) Prior Publication Data
US 2013/0100936 A1    Apr. 25, 2013

Related U.S. Application Data

(60) Provisional application No. 61/543,093, filed on Oct. 4, 2011.

(51) Int. Cl.
*H04B 7/212* (2006.01)
*H04W 72/04* (2009.01)
*H04W 72/14* (2009.01)
*H04W 72/12* (2009.01)

(52) U.S. Cl.
CPC .......... *H04W 72/0446* (2013.01); *H04W 72/14* (2013.01); *H04W 72/1221* (2013.01); *H04W 72/1294* (2013.01)
USPC ............................ 370/348; 370/443; 370/447

(58) Field of Classification Search
CPC . H04W 28/26; H04W 72/04; H04W 72/0406; H04W 72/0446; H04W 72/1294; H04W 72/1221; H04W 72/14

USPC .......................................... 370/348, 443, 447
See application file for complete search history.

(56) References Cited

U.S. PATENT DOCUMENTS

2010/0074206 A1 *  3/2010  Yu et al. ........................ 370/329
2010/0110964 A1 *  5/2010  Love et al. .................... 370/312

FOREIGN PATENT DOCUMENTS

WO          2009116939 A2    9/2009
WO     WO 2009116939 A2 *  9/2009

(Continued)

OTHER PUBLICATIONS

3GPP TS 36.321 V9.1.0 (2009-12).*

(Continued)

*Primary Examiner* — Mang Yeung
(74) *Attorney, Agent, or Firm* — Coats & Bennett, P.L.L.C.

(57) ABSTRACT

The present invention relates to a method of a base station, the method comprising: obtaining information about a service currently used by a communication terminal associated with the base station; performing predictive scheduling of transmissions from the communication terminal to the base station based on the obtained information, the predictive scheduling including determining an interval I which is the predicted maximal time period between consecutive transmission grants sent by the base station to the communication terminal; sending a first transmission grant to the communication terminal at the time t=0 in accordance with the predictive scheduling; sending a first SR inhibiting indicator to the communication terminal, preventing the communication terminal from sending a Scheduling Request (SR) to the base station unless a specified criterion is fulfilled; and sending a second transmission grant to the communication terminal at the latest at the time t=I. The invention also relates to the base station.

16 Claims, 6 Drawing Sheets

(56) References Cited

FOREIGN PATENT DOCUMENTS

WO         2011038768 A1     4/2011
WO    WO 2011038768 A1 *  4/2011

OTHER PUBLICATIONS

Ericsson, 3GPP TSG-RAN WG2 #69 (Tdoc R2-101199), Feb. 22-26, 2010.*
Miyazaki, 3GPP TSG-RAN #67bis (Tdoc R2-095513), Dec. 12-16, 2009.*
Nokia Siemens Networks, et al., "SR Prohibit", 3GPP TSG-RAN Meeting #67bis, Miyazaki, Japan, Oct. 12, 2009, pp. 1-4, Change Request 36.321 0nnn, Version 9.0.0, R2-095513, 3rd Generation Partnership Project, XP 50389947.
3RD Generation Partnership Project, "3rd Generation Partnership Project; Technical Specification Group Radio Access Network; Evolved Universal Terrestrial Radio Access (E-UTRA) Medium Access Control (MAC) protocol specification (Release 9)", Technical Specification, 3GPP TS 36.321 V9.1.0, Dec. 1, 2009, pp. 1-46, 3GPP, France, XP 50401617.
Ericsson, et al., "Unintentional SR suppression", 3GPP TSG-RAN WG2 #69, San Francisco, USA, Feb. 22, 2010, pp. 1-4, Tdoc R2-101199, 3rd Generation Partnership Project, XP 50421771.

* cited by examiner

SCHEDULING OF A COMMUNICATION BASE STATION

TECHNICAL FIELD

The present invention relates to a method and a base station for improved predictive dynamic transmission scheduling in a communication system.

BACKGROUND

In e.g. LTE, all uplink transmissions are scheduled by the base station. A grant is transmitted on the downlink control channel PDCCH and the mobile terminal responds with a transmission using the resources specified in the grant and with the size specified in the grant. The mobile terminal can let the base station know that it wants to transmit by sending a scheduling request (SR) on the uplink control channel PUCCH at predefined times. Typically the mobile terminal transmits an SR which is followed by one or many grants, each resulting in one uplink transmission. This is commonly referred to as dynamic scheduling.

It is not required that an SR precedes the grant. When the base station knows that a mobile has a periodic service or for some other reason can predict future data arrivals it can transmit a grant to the mobile without waiting for an SR. It is also possible to blindly transmit grants in order to speed up the scheduling and hence reduce the delay. These scheduling methods are called predictive scheduling.

Discontinuous Reception (DRX) is a mechanism that is specified to save power in a mobile terminal. It allows the terminal to turn off its receiver and transmitter according to predefined rules while maintaining a connection to the base station. The RRC protocol is used to configure DRX cycles and timers that define when the terminal should monitor the downlink control channel PDCCH. When no transmissions are scheduled the mobile wakes up for "on duration" milliseconds during each DRX cycle. There are both long and short DRX cycles. There is also an inactivity timer that keeps the mobile active after the reception of a grant which indicates that data may be transmitted, and the PDCCH is monitored when an ACK/NACK is expected. In addition the mobile terminal is active from the time that an SR is sent until a grant is received. These mechanisms are illustrated in FIG. 1.

Instead of dynamic scheduling, semi-persistent scheduling (SPS) can be used. The purpose with SPS is to save resources on the PDCCH when it is known beforehand when data will arrive to the mobile terminal. When SPS is used, a semi-persistent scheduling interval is signalled to the mobile terminal through the RRC protocol. Special grants (SPS grants/semi-persistent scheduling uplink grants) are then used to configure a recurring grant with the specified interval. One grant can hence be used for multiple transmissions, see FIG. 2. The semi-persistent grant is valid until it is cancelled by a special grant that explicitly releases the semi-persistent grant. To optimize the power saving with SPS, a mechanism has been added so that no SR is triggered by specified logical channels while an SPS grant is configured.

SUMMARY

The inventor has realised that The LTE MAC specification assumes that uplink semi-persistent scheduling (SPS) is used for all services which are predictable. The possibilities that there exist scenarios where SPS is not optimal for all users (or any user) were not considered when the specification was written.

There may be many occasions when SPS is not desirable, for instance if the SPS standard is not implemented in the base station, and SPS may lead to non-optimal use of the resources controlled by the base station, for example physical resource blocks.

On the other hand, the inventor has realised that using the DRX standard may result in sub-optimal battery use when predictive scheduling is used instead of SPS. This is due to the fact that predictive scheduling does not rely on the reception of SRs to decide when to send a grant to a communication terminal. Depending on the utilization of the PDCCH and the priority of the communication terminal, the time between when an SR is triggered and when the grant is transmitted may be long, even longer than when non-predictive dynamic scheduling is used.

When SPS is not used, the DRX functionality is specified so that all arrival of data in an empty buffer will trigger a scheduling request. When a scheduling request is sent, the communication terminal receiver is activated until a grant is received. This implies that when the scheduling delay is high, the receiver will be turned on more than is needed.

An example of this, illustrating dynamic VoIP scheduling during a talk spurt, is illustrated in FIG. 3.

According to the present invention, a problem with the prior art is at least alleviated by inhibiting the communication terminal from sending one or several SR when the base station is using predictive scheduling, e.g. by making the communication terminal think that SPS is used even though the base station uses predictive scheduling (sending a new grant to trigger each transmission from the communication terminal). It may thus be possible to use the functionalities already included in the 3GPP Release 9 for implementing the present invention.

According to an aspect of the present invention, there is provided a method of an electronic communication base station. The method comprises obtaining information about a service currently used by a communication terminal associated with the base station. The method further comprises the base station performing predictive scheduling of transmissions from the communication terminal to the base station based on the obtained information. The predictive scheduling includes determining an interval I which is the predicted maximal time period between consecutive transmission grants sent by the base station to the communication terminal. The method further comprises sending a first transmission grant to the communication terminal at the time $t=0$ in accordance with the predictive scheduling, and sending a first SR inhibiting indicator to the communication terminal, preventing the communication terminal from sending a Scheduling Request (SR) to the base station unless a specified criterion is fulfilled. The method further comprises sending a second transmission grant to the communication terminal at the latest at the time $t=I$.

According to another aspect of the present invention, there is provided an electronic communication base station. The base station comprises an information obtaining module with circuitry configured for obtaining information about a service currently used by a communication terminal associated with the base station. The base station further comprises a processing unit with circuitry configured for performing predictive scheduling of transmissions from the communication terminal to the base station based on the obtained information. The predictive scheduling includes determining an interval I which is the predicted maximal time period between consecutive transmission grants sent by the base station to the communication terminal. The base station further comprises a transmitter configured for sending a first transmission grant to the communication terminal at the time t=0 in accordance with the predictive scheduling, and for sending a first SR inhibiting indicator to the communication terminal, preventing the communication terminal from sending a Scheduling Request (SR) to the base station unless a specified criterion is fulfilled. The transmitter being further configured for sending a second transmission grant to the communication terminal at the latest at the time t=I.

According to another aspect of the present invention, there is provided an electronic communication base station. The base station comprises means for obtaining information about a service currently used by a communication terminal associated with the base station. The base station further comprises means for performing predictive scheduling of transmissions from the communication terminal to the base station based on the obtained information. The predictive scheduling includes determining an interval I which is the predicted maximal time period between consecutive transmission grants sent by the base station to the communication terminal. The base station further comprises means for sending a first transmission grant to the communication terminal at the time t=0 in accordance with the predictive scheduling, and for sending a first SR inhibiting indicator to the communication terminal, preventing the communication terminal from sending a Scheduling Request (SR) to the base station unless a specified criterion is fulfilled. The base station further comprises means for sending a second transmission grant to the communication terminal at the latest at the time t=I.

Any of the base station aspects of the present invention may be used for performing the method aspect of the present invention.

According to another aspect of the present invention, there is provided a communication system comprising a base station according to the above base station aspect of the present invention and a communication terminal.

According to another aspect of the present invention, there is provided a computer program product comprising computer-executable components for causing an electronic communication base station to perform the method of the above method aspect of the present invention when the computer-executable components are run on a processing unit included in the base station.

Other aspects of the present invention are apparent to the person skilled in the art from the disclosure herein.

The first transmission grant and the first SR inhibiting indicator may be sent to the communication terminal together as parts of a first grant message. The first grant message may be a semi-persistent scheduling, SPS, grant message. The SPS grant message may comprise an SPS interval which is at least as long as the predicted time interval I, or which is the longest SPS interval allowed by a communication standard used for communication between the base station and the communication terminal.

The predictive scheduling may further include determining a transmission size X which is the predicted maximum amount of data generated by the service and buffered at the communication terminal for transmission to the base station during the time interval I, and including said transmission size X in the first transmission grant.

The specified criterion may be one of the following: the time t equals I; the time t equals a specified time which exceeds I; the amount of data buffered for transmission to the base station equals or exceeds X; and data associated with a certain logical channel has arrived to the communication terminal for transmission to the base station.

The first SR inhibiting indicator may need to be replaced within a limited time period, why a second SR inhibiting indicator may be sent to the communication terminal prior to expiry of the limited time period.

The discussions above and below in respect of any of the aspects of the invention is also in applicable parts relevant to any other aspect of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

Figure 1:
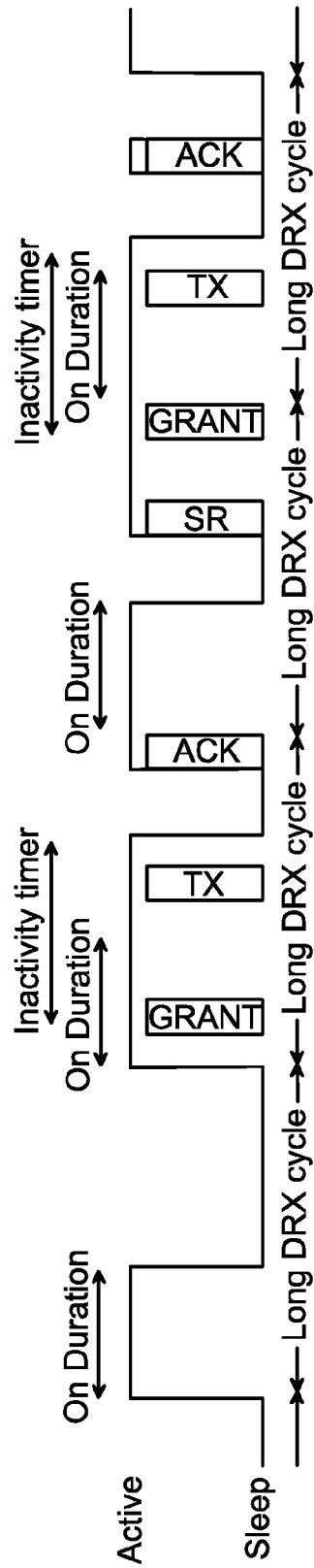
FIG. 1 is a diagram illustrating the sleeping and active periods of a transmitter/receiver of a mobile terminal using DRX (simplified) in a case of only uplink transmissions, according to prior art.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Abbreviations

UE: User Equipment
BS: Base Station
eNB: Enhanced Node-B

3GPP: 3rd Generation Partnership Project
LTE: 3GPP Long Term Evolution
PDCCH: Physical Downlink Control Channel
PUCCH: Physical Uplink Control Channel
PHICH: Physical Hybrid Automatic Repeat Request Indicator Channel
PUSCH: Physical Uplink Shared Channel
DRX: Discontinuous Reception
SPS: Semi-Persistent Scheduling
RRC: Radio Resource Control
MAC: Media Access Control
VoIP: Voice over Internet Protocol
SR: Scheduling Request
A; ACK: Acknowledgement
NACK: Negative Acknowledgement
G: Grant
T; TX: Transmission
ms: Millisecond The communication network described herein may be a mobile communication network which can comply with the LTE standard of 3GPP or any other applicable standard such as W-CDMA, GSM, etc. Hereinafter, references are on occasion made to LTE, but it is to be noted that this is exemplary and does not restrict the embodiments, which can be applied to any suitable standard.

The discussion herein is mainly directed to wireless communication wherein the communication terminal communicates with a network node/base station to which it is associated over a radio interface. It is preferred that the electronic communication base station is configured to communicate with the communication terminal over a radio interface. However, the present invention may also be relevant to wired communication.

The communication terminal may be any suitable communication terminal, depending on the communication standard used, and is herein exemplified with e.g. a UE. However, the terms communication terminal and UE may herein often be used interchangeably and should not limit the invention to a type of communication terminal or to a communication standard. The communication terminal may e.g. be a mobile phone or a laptop computer, or another type of communication terminal.

The base station or electronic communication base station may be any suitable base station, depending on the embodiment of the invention and the communication standard used, such as a base station in GSM, an RNC or Node B in HSPA, or an eNode B or a positioning node in LTE. However, whichever network node is mentioned herein, it is only to be regarded as an example and should not limit the invention to a type of network node or to a communication standard.

The information about the service currently used by the communication terminal may e.g. be obtained from the communication terminal, possibly by examining transmissions from the terminal, or it can be obtained from signalling setting up the logical channel or application layer signalling.

The service used by the communication terminal may be any service which the communication terminal is able to use, e.g. VoIP or a gaming service.

The maximum predictive scheduling interval I may depend on the delay requirement of the service, the scheduling interval may e.g. be equal to the delay requirement of the service. The scheduling interval may be the same for any number of consecutive transmission grants sent to the communication terminal, or the scheduling interval may vary between different transmission grants. Several transmissions may be scheduled in one interval I and if the load is so high that not all services can be scheduled within their delay limits, the time between grants may exceed this interval.

The first transmission grant sent to the communication terminal may allow the communication terminal to transmit data generated by the service and buffered in the communication terminal from the communication terminal to the base station. The transmission grant may also specify the amount of data which the communication terminal is allowed to transmit to the base station, e.g. the transmission size X. The transmission size X may be the same for any number of consecutive transmission grants sent to the communication terminal, or the transmission size X may vary for different transmission grants. The communication terminal may be able to send an allowed amount of data to the base station in a single communication message, or the communication terminal may transmit the data in several communication messages, all of which are thus triggered by the same transmission grant. For illustrative purposes, the time t at which the first transmission grant message is sent to the communication terminal is set to t=0, but this should not limit the sending of the message to any specific time slot or such, it is purely to relate the sending of the message to the sending of any later or earlier message. That the first transmission grant is herein denoted as the "first" is only a way of naming the transmission grant and putting it in relation to the "second" transmission grant, which is consecutive to the first transmission grant, and does in no way preclude the possible existence of any earlier transmission grant.

Figure 2:
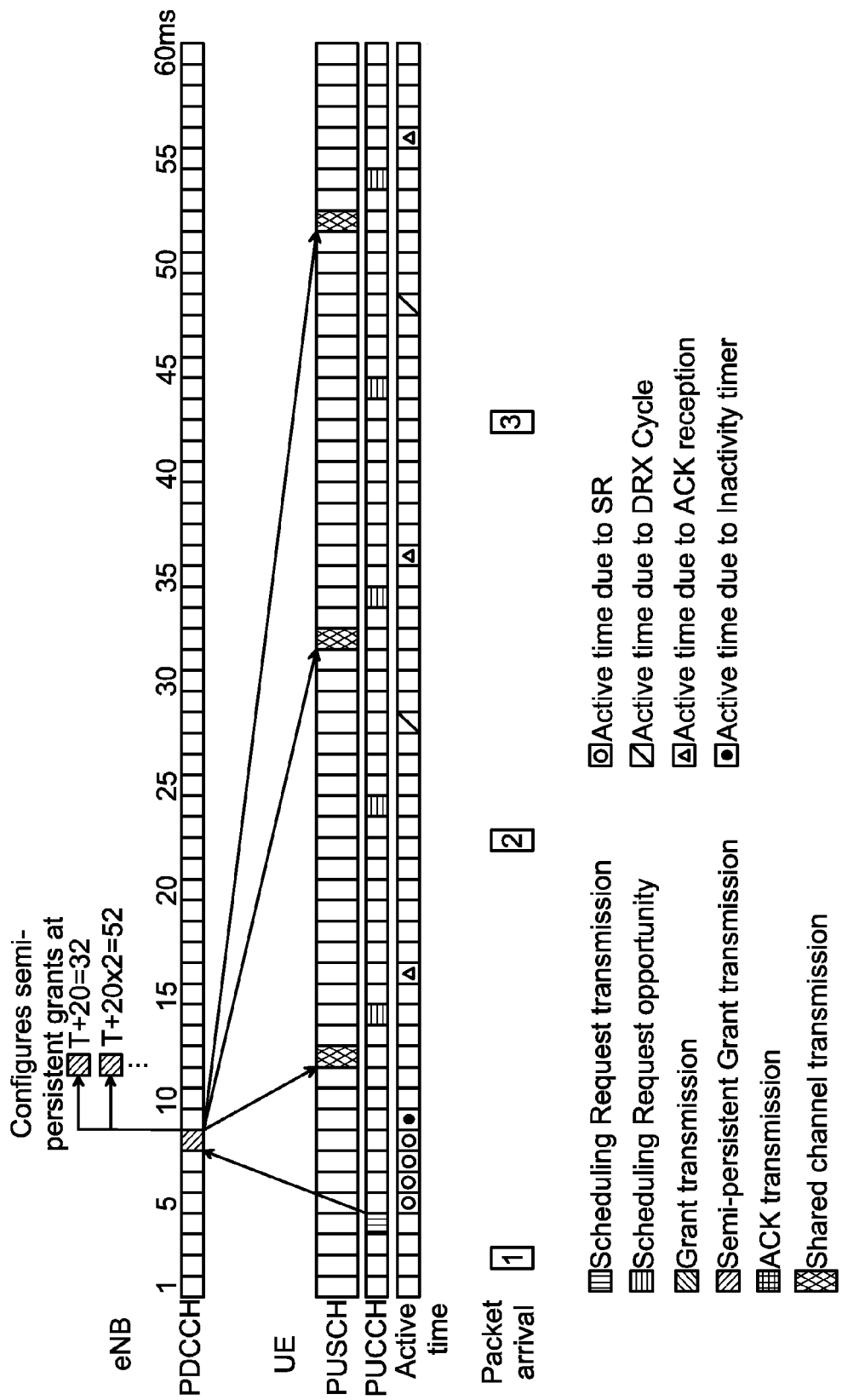
FIG. 2 is a diagram illustrating semi-persistent scheduling with a scheduling interval of 20 ms, according to prior art.
Figure 3:
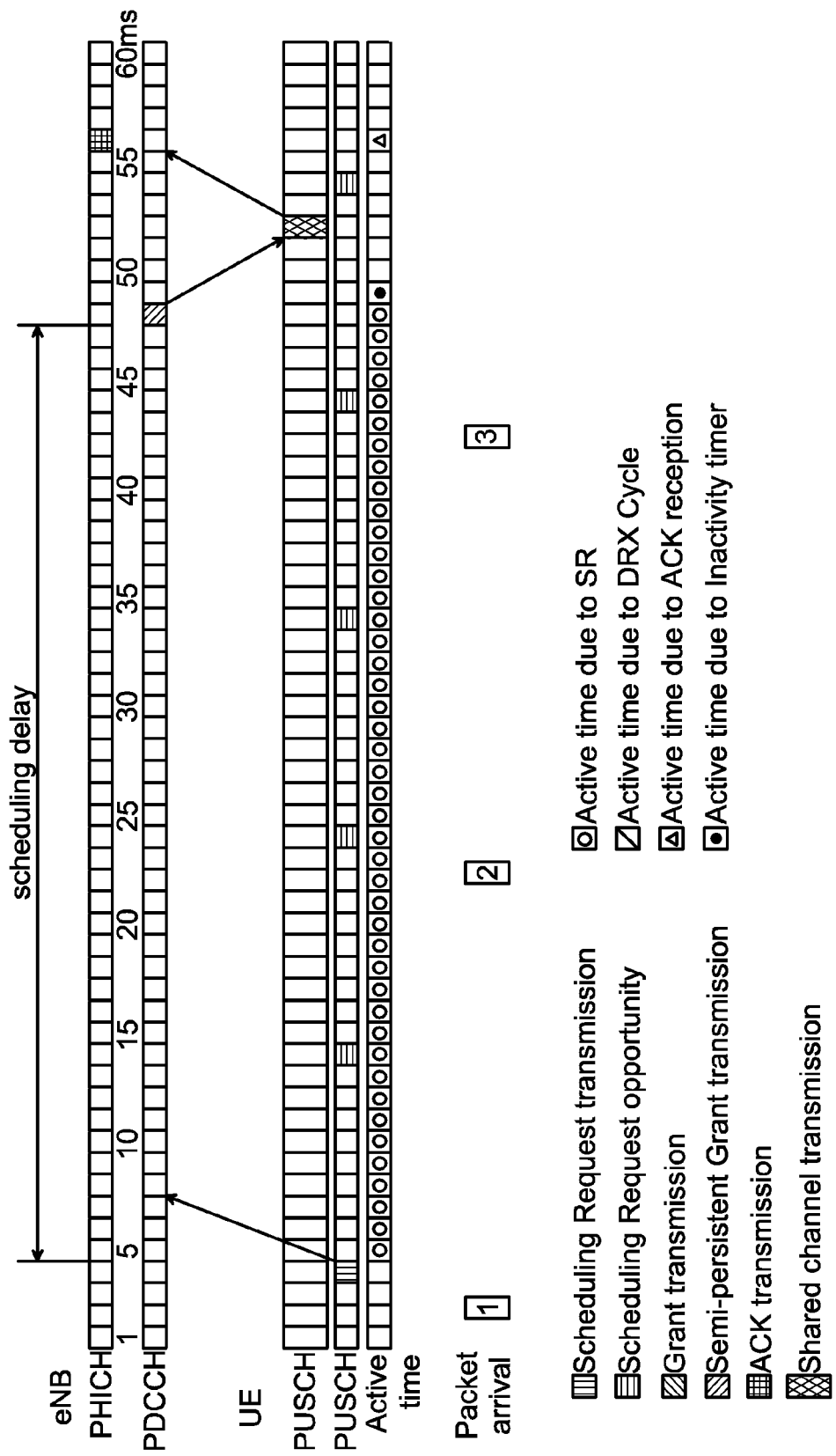
FIG. 3 is a diagram illustrating using DRX where the UE receiver is turned on longer than needed for receiving a grant, due to a scheduling delay from predictive scheduling used by the eNB, according to prior art.

A first SR inhibiting indicator is sent to the communication terminal. The SR inhibiting indicator is arranged to, e.g. with setting the logicalChannelSR-Mask for the logical channel(s) carrying the service, prevent the communication terminal from sending one or several SR, especially SR for the data generated by the service. Since this data is already handled by the base station by means of predictive scheduling, it is advantageous to reduce the strain on the uplink and downlink control channels by inhibiting redundant SR. The first SR inhibiting indicator may e.g. be sent to the communication terminal as part of the same message as the first transmission grant, e.g. called the first transmission grant message. This has an advantage of reducing the number of messages sent to the communication terminal and relieving the control channels. One specific example is that an SPS grant message may be used. As discussed above and in FIG. 2, an SPS grant may functions as a grant and also act to inhibit future SR since future grants at a set interval is already included in the SPS grant. This interval is configured with the RRC protocol. Thus, an SPS grant may be used, together with the logicalChannelSR-Mask, to inhibit future SR even if the base station uses predictive scheduling, not SPS. Provided that the SPS interval is set to a longer time period than I, the SPS grant may inhibit SR transmission at least until the sending of the second transmission grant from the base station to the communication terminal. Conveniently, the SPS grant interval may be set to the longest interval allowed by the standard. Before the end of the SPS interval, a second SPS grant may be sent to the communication terminal, e.g. in a second or further transmission grant message, which second SPS grant may reconfigure the future grants included in the first SPS grant and thus continue to inhibit SR transmissions without actually using SPS at the base station. An other advantage with using SPS grant is that this is already defined in the LTE standard, why the present invention may be implemented without the need to additions to the standard.

SR transmissions are prevented until a specified criterion is fulfilled. In the example with SPS grant, the criterion may be the communication terminal receiving a specific release grant message from the base station, as defined in the SPS standard. Another currently contemplated criterion is that t equals or exceeds I or t equals a specified value larger than I, i.e. that a time equal to or longer than the predicted maximum time period allowed between two consecutive grants, possibly the delay requirement of the service, has elapsed from the first transmission grant at t=0, such that the service is not interrupted. Yet another contemplated criterion is that the amount of data, possibly data specifically generated by the service, buffered in the communication terminal for transmission to the base station exceeds the transmission size X of the first transmission grant, allowing an SR to be sent if the real amount of data exceeds the amount of data predicted at the predictive scheduling of the base station, thus allowing the communication terminal to send an SR to request additional scheduling if the predictive scheduling is not sufficient. Still another contemplated criterion is that data associated with a certain logical channel, possibly a logical channel not accounted for in the predictive scheduling, arrives to the communication terminal for forwarding to the base station. By means of any of these criteria, or any other suitable criterion, the predictive scheduling of the present invention is more dynamic and flexible than e.g. SPS. More than one criterion may be used, e.g. a combination of any of the criteria specifically discussed here.

A second transmission grant is sent from the base station to the communication terminal in accordance with the predictive scheduling. This differs from when e.g. SPS is used where a single SPS grant includes a plurality of grants at a specified interval. The second transmission grant is sent at or prior to t=I, i.e. the second transmission grant is sent at least when the predicted maximal time period between the first transmission grant and the second transmission grant has elapsed, thus not interrupting the service provided that the service behaves as predicted. If the service does not behave as predicted, the criteria discussed in the previous paragraph may be used.

The inventive method may also comprise the base station sending a second SR inhibiting indicator to the communication terminal. As discussed above in respect of the first SR inhibiting indicator, the second SR inhibiting indicator may be transmitted together with a transmission grant in a transmission grant message, e.g. an SPS grant message, or it may be sent in a message separate from any transmission grant. The second SR inhibiting indicator may e.g. be transmitted as a part of a second transmission grant message together with the second transmission grant. However, an SR inhibiting indicator, e.g. the first SR inhibiting indicator, may act to inhibit SR transmission for a longer period of time than the time interval I, even several times longer, e.g. depending on its specified criterion, why an SR inhibiting indicator may only have to be sent e.g. every second, third, fourth or fifth transmission grant, or no second SR inhibiting indicator may be needed at all. If an SPS grant is used for the SR inhibiting indicator, no second SR inhibiting indicator may be needed to extend the SR inhibiting effect. It may, however, be convenient to prevent the SPS grant from triggering a (second) transmission from the communication terminal to the base station after the duration of its set SPS interval, since predictive scheduling is used according to the present invention and a second grant is instead sent by the base station. The SPS interval is conveniently set to a long time period, preferably the longest period allowed by the communication standard and/or preferably at least as long as the predicted time interval I or at least two, three, four or five times as long as the time interval I. Then, a second SR inhibiting SPS grant, preferably cancelling the first SR inhibiting SPS grant, may be sent to the communication terminal before the time period of the SPS interval of the first SR inhibiting SPS grant has run out, thereby extending/maintaining the SR inhibiting action without allowing the first SR inhibiting SPS grant to trigger any further transmission from the communication terminal. The SPS grant(s) may thus be regarded as being deliberately under dimensioned in respect of the predicted transmission need of the communication terminal/UE in respect of the service.

Above, the method, and in analogy also the base station, of the present invention has been discussed with reference to two consecutive transmission grants related to a service used by the communication terminal. However, many more transmission grants may be predictively scheduled. For example, the second transmission grant may be regarded as the first transmission grant in relation to a following consecutive transmission grant and so on. Similarly, the second SR inhibiting indicator may be regarded as the first SR inhibiting indicator in relation to a following consecutive SR inhibiting indicator.

Figure 4:
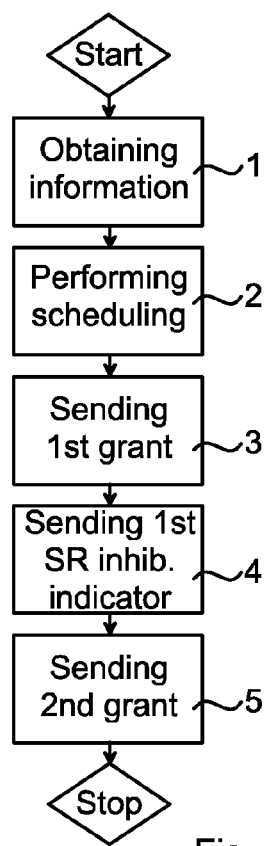
FIG. 4 is a schematic flow chart illustrating an embodiment of a method of the present invention.

With reference to FIG. 4, an embodiment of a method according to the present invention will now be discussed. The method may be performed by the communication network, such as by a network node or base station of the network. Information about a service currently used by a communication terminal associated with the base station is obtained in step 1. The network, e.g. the base station, may e.g. obtain 1 the information by the communication terminal or another base station or other network node sending a message to the network/base station comprising said information, e.g. as an information element (IE) in such a message. The message may e.g. be a conventional message as defined in the communication standard used and sent from the communication terminal to the base station for informing the base station about, e.g. transmission requirement from the communication terminal to the base station, the service. Predictive scheduling is performed in step 2. The predictive scheduling comprises scheduling transmissions from the communication terminal to the base station based on the obtained 1 information. The scheduling may specifically relate to the service used by the communication terminal. The predictive scheduling may include determining an interval I which is the predicted maximal time period between consecutive transmission grants sent from the base station to the communication terminal. The time interval I may be regarded as the maximum time interval between transmissions from the communication terminal to the base station allowed for maintaining the service or for maintaining the service optimally (e.g. without reduced service performance). The time interval I may, in addition to being dependent on the service, also depend on the amount of data allowed to be sent in each transmission, e.g. determined by the size X of the grant. A first transmission grant is sent in step 3. The transmission grant is sent 3 in accordance with the performed 2 predictive scheduling to the communication terminal, e.g. from the base station, at the time t=0. The time is here set to zero in order to be able to easily relate later transmissions to the send time of this first transmission grant. The time t is thus only a relative time used for illustrative purposes for more easily defining the present invention. A first SR inhibiting indicator is sent in step 4. That the SR inhibiting indicator is a first SR inhibiting indicator is intended to distinguish it from any later sent SR inhibiting indicator(s). It should, however, be noted that, depending on the embodiment of the method of the present invention, any later sent SR inhibiting indicator may not be needed, why the first SR inhibiting indicator may be the only SR inhibiting indicator of the inventive method. The first SR inhibiting indicator is sent 4 to the communication terminal for preventing said communication terminal from sending a scheduling request (SR) to the base station. The first SR inhibiting indicator may be limited to only preventing the communication terminal from sending an SR in respect of the service. The first SR inhibiting indicator may be limited to only preventing the communication terminal from sending an SR unless a specified criterion is fulfilled, as discussed herein. A second transmission grant is sent to the communication terminal in step 5. The second transmission grant is sent at the latest at the time t=I, i.e. within the predicted maximal time period between consecutive transmission grants calculated from the sending 3 of the first transmission grant.

Figure 5:
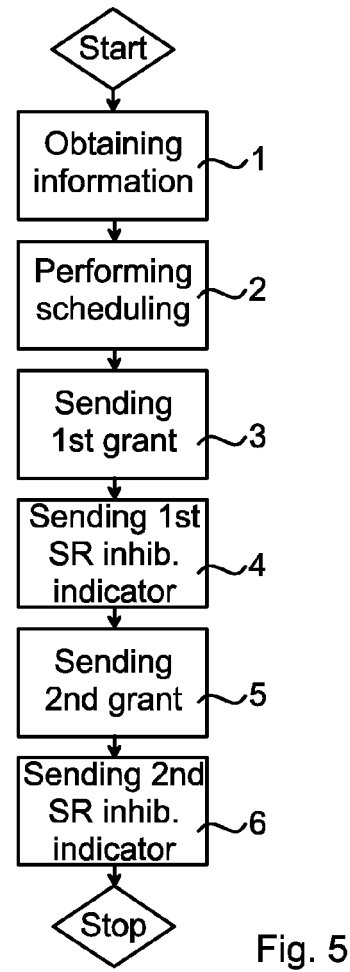
FIG. 5 is a schematic flow chart illustrating another embodiment of a method of the present invention.

FIG. 5 illustrates another embodiment of a method of the present invention. Steps 1-5 may be performed as discussed in relation to FIG. 4. In an additional step 6, a second SR inhibiting indicator is sent 6 to the communication terminal prior to expiry of a limited time period within which the first SR inhibiting indicator needs to be replaced. The first SR inhibiting indicator may e.g. need to be replaced in order to extend the SR inhibiting action or in order to prevent the communication terminal from transmitting data without having received a grant in accordance with the predictive scheduling.

Figure 6:
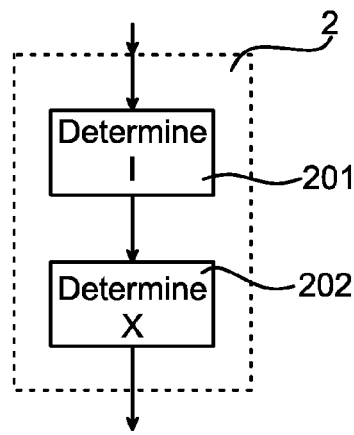
FIG. 6 is a schematic flow chart illustrating possible substeps of a step of the method of FIG. 4 or 5.

FIG. 6 illustrates possible sub-steps of step 2 in FIGS. 4 and 5. The predictive scheduling may comprise determining 201 the time interval I as discussed herein. The predictive scheduling may alternatively or additionally comprise determining 202 a transmission size X which is the predicted maximum amount of data generated by the service and buffered at the communication terminal for transmission to the base station during the time interval I. The transmission size X may be included in the first grant sent in step 3 of FIGS. 4 and 5. Thus, the first grant may allow the communication terminal to, in response to the first grant, transmit an amount of data generated by the service which amount is less than or equals the transmission size X.

Figure 7:
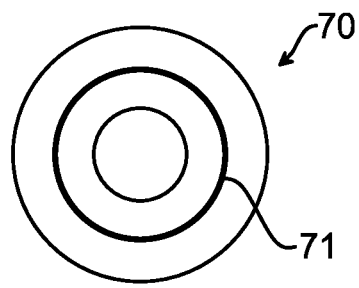
FIG. 7 is a schematic illustration of a computer program product of the present invention.
Figure 8:
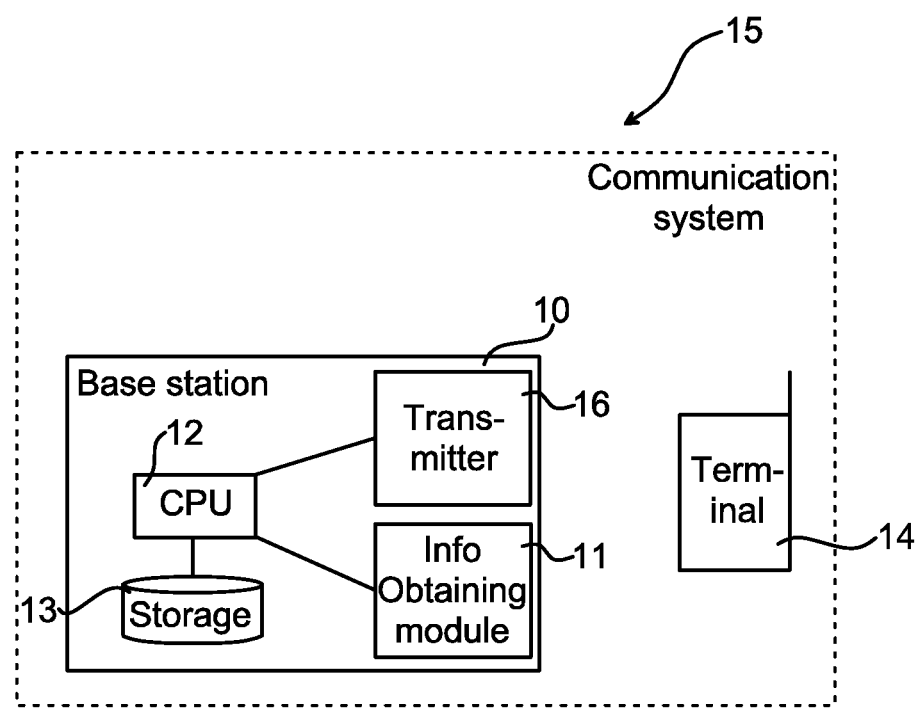
FIG. 8 is a schematic block diagram illustrating an embodiment of a base station of the present invention, as well as an embodiment of a communication system according to the present invention.

With reference to FIGS. 7 and 8, the communication base station 10 of embodiments of the present invention may be a equipped with one or more processing units CPU 12, e.g. in the form of microprocessor(s) executing appropriate software stored in associated memory storage 13 for procuring required functionality. However, other suitable devices with computing capabilities could be used, e.g. an application specific integrated circuit (ASIC), a field programmable gate array (FPGA), a complex programmable logic device (CPLD), etc., for performing a method of the present invention, while executing appropriate software stored in a suitable storage area 13, on a computer readable medium or computer program product 70, such as a RAM, a Flash memory or a hard disk, comprising computer-executable components/software 71 for causing the electronic communication base station 10 to perform the method of the present invention.

FIG. 8 illustrates an embodiment of a base station 10, e.g. an electronic communication base station 10, of the present invention. FIG. 8 additionally illustrates an embodiment of a communication system 15 of the present invention.

The base station 10 comprises an information obtaining module 11. The information obtaining module 11 is configured for, e.g. has circuitry configured for, obtaining 1 information about a service currently used by a communication terminal 14 associated with the base station 10, as discussed above e.g. in respect of FIGS. 4, 5 and 6. The base station 10 also comprises a processing unit/CPU 12 configured for, e.g. with circuitry configured for, performing 2 predictive scheduling of transmissions from the communication terminal 14 to the base station 10, as discussed above e.g. in respect of FIGS. 4 and 5. The base station 10 further comprises a transmitter, or sending/transmitting means, 16 configured for, e.g. with circuitry configured for, sending 3 a first transmission grant to the communication terminal 14 at the time t=0, for sending 4 a first SR inhibiting indicator to the communication terminal 14, and for sending 5 a second transmission grant to the communication terminal 14 at the latest at the time t=I, as discussed above e.g. in respect of FIGS. 4 and 5. The base station 10 may additionally comprise a memory or other storage means 13, e.g. comprising a computer readable medium or computer program product 70 with computer-executable components/software 71 (FIG. 7). The storage means 13 may thus interact/co-operate with the processing unit 12 for executing the executable components 71 of the medium 70.

The communication system 15 comprises a base station 10, such as a base station in accordance with the base station 10 discussed above, also in respect of FIG. 8. The communication system 15 also comprises a communication terminal 14, which may be any suitable communication terminal, as discussed herein. The communication system may be configured for any suitable communication standard, such as a communication standard for wireless communication between the base station 10 and the communication terminal 14. The base station 10 as well as the communication terminal 14 may thus each be configured to communicate with each other wirelessly over a radio interface. The communication system 15 may also comprise further base station(s) 10 or other network node(s) of a network/core network of the communication system 15, as well as further communication terminal(s) 14.

Figure 9:
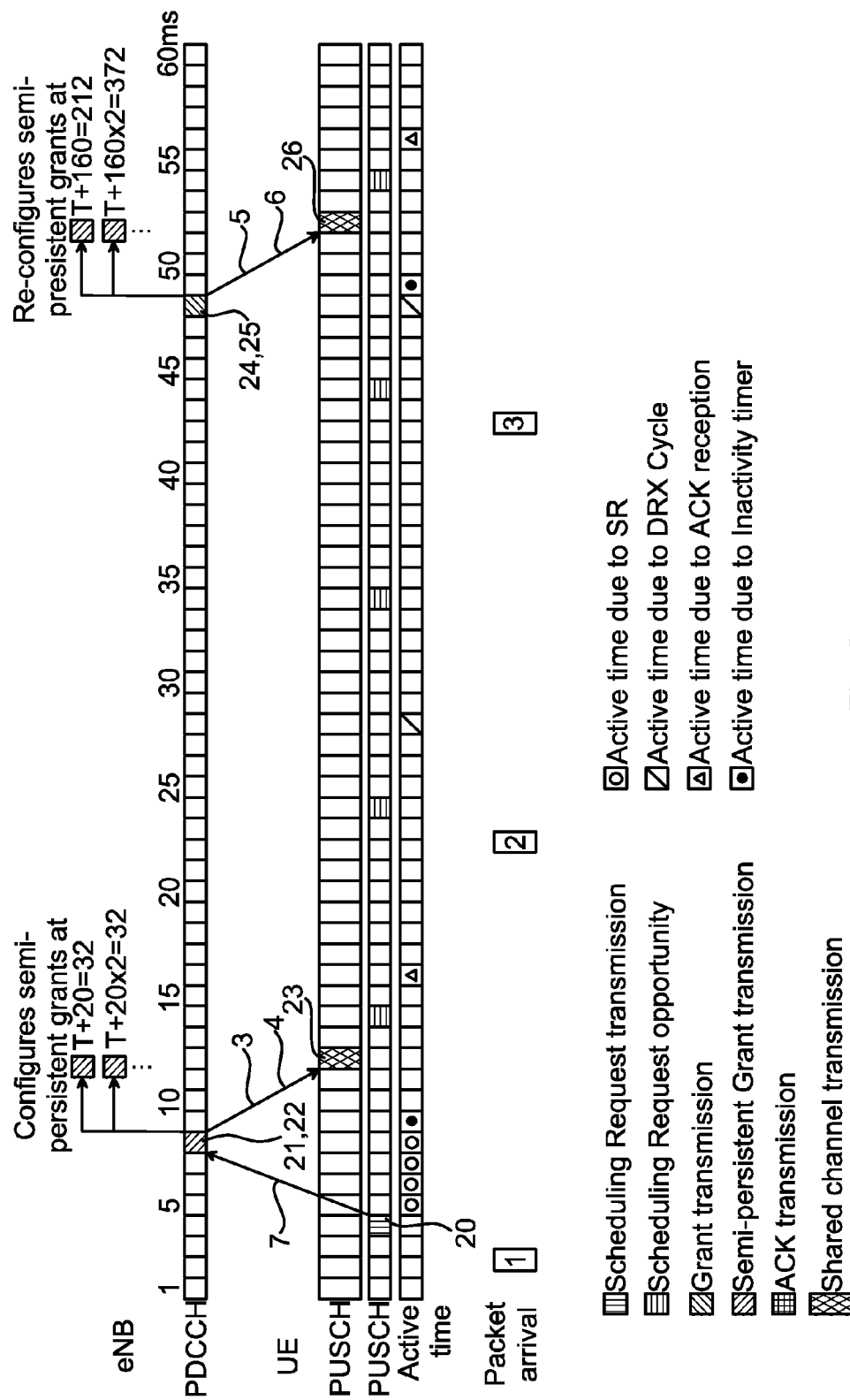
FIG. 9 is a diagram illustrating a specific exemplary embodiment of a method of the present invention.

FIG. 9 illustrates a specific embodiment of a method of the present invention, which is also discussed below in example 1. A communication terminal 14 in the form of a UE is using a service which generates data packets which arrive to a transmission buffer of the UE as illustrated by the packet boxes 1, 2 and 3 arriving at times 2, 22 and 42 ms, respectively, in FIG. 9. In response to the arrival of packet 1, the UE sends 7 an SR 20 at the time 4 ms in FIG. 9 on the PUCCH to a base station 10 in the form of an eNode B (eNB). The SR 20 may comprise all or at least a part of the information about the service which is obtained 1 by the eNode B 10. The obtaining 1 information as discussed herein may thus comprise or consist of receiving this SR 20 sent 7 from the UE 14 to the eNB 10. In response to the received SR 20, the eNB 10 performs 2 predictive scheduling, i.a. determining the time interval I, and produces a first transmission grant 21 as well as a first SR inhibiting indicator 22. According to the embodiment illustrated in FIG. 9, the first transmission grant 21 and the first SR inhibiting indicator 22 are combined in the form of an SPS grant 21, 22. In this case, the SPS grant comprises an SPS period/interval of 160 ms, which implies that it allows the UE 14 to transmit data from the service when the UE 14 receives the SPS grant and every 160 ms thereafter. Since indefinite periodic transmissions are thus granted for the service, the UE 14 does not have to send 7 any further SR 20 for receiving a transmission grant 21, why further SR transmissions are to be prevented by the SR inhibiting indicator part 22 of the SPS grant. The SPS grant 21, 22 is then sent 3, 4 to the UE 14 on the PDCCH, prompting the UE 14 to transmit a first data transmission 23 to the eNB 10 on the PUSCH. Due to the SR inhibiting action of the SPS grant, no further SR is sent by the UE 14 in response to the arrival of the data packages 2 and 3 to the transmit buffer of the UE 14. The UE 14 is instead prepared for performing the second data transmission 160 ms after the previous data transmission, in accordance with the SPS grant. However, before the UE 14 is to make the second data transmission, and within the time interval I from the sending 3, 4 of the first transmission grant 21, a second combined transmission grant 24 and SR inhibiting indicator 25 is sent 5, 6 from the eNB 10 to the UE 14 in the form of a second SPS grant 24, 25, prompting the UE to make the second data transmission 26 in response to the second transmission grant 24 instead of waiting for the next periodic transmission grant in accordance with the first SPS grant 21. The second SPS grant 24, 25 cancels the first SPS grant 21, 22 and sets a new long SPS period of 160 ms. Further SPS grants may be sent in this way in accordance with the predictive scheduling performed 2, in effect prompting transmissions e.g. every 40 ms, instead of every 160 according to the SPS grant(s). In this way, transmission of data generated by the service is sent from the UE 14 to the eNB 10 in accordance with the predictive scheduling performed 2 by the eNB 10, while the UE 14 is in SPS mode. Thus, problems of the prior art with SPS, DRX, predictive scheduling and the like may be alleviated or solved.

Example 1

When an eNB knows that a UE has a periodic service or for some other reason can predict future data arrivals and not wants to schedule the data using SPS, i.e. the data should be scheduled dynamically with one grant for each transmission, the RRC is used to configure a semi-persistent scheduling (SPS) interval that is significantly longer than maximum interval I between the transmissions of the (predictive) grants. If we for example have a VoIP service with 20 ms periodicity and 80 ms delay requirement, grants should be transmitted at least once every 100 ms and we can select an SPS interval of e.g. 160 ms. It should be noted that at high load, the base station may not be able to fulfil the delay requirement. The simplest solution may be to always use the maximum periodicity for the SPS grant interval. The RRC is also used to configure the logicalChannelSR-Mask for the logical channel carrying the service which we want to schedule predictively.

When the eNB detects that the periodic service has started (e.g. a VoIP talk spurt) a semi-persistent grant is transmitted to the UE. This will trigger a transmission from the UE, but also configure an additional grant in the future (based on the semi persistent interval), see FIG. 9. The UE can still receive grants whenever it monitors the PDCCH, both ordinary grants and new semi-persistent grants that reconfigures the time and resources of future grants.

This future SPS configured grant together with the logical-ChannelSR-Mask will block the periodic service (e.g. VoIP) from triggering scheduling requests. Since no scheduling request is triggered, the UE will follow the ordinary DRX cycle and only turn on the receiver during the configured DRX cycles (unless other events trigger DRX active time). Additional semi-persistent grants are used to move the future SPS configured grant further into the future unless the scheduler chooses to let the UE use the grant, see FIG. 9.

If the eNB detects that the periodic service has stopped (e.g. the end of a VoIP talk burst), the semi-persistent grant is explicitly released by transmitting a special SPS release grant in accordance to the SPS standard.

Example 2

In this example, the specified criterion of the SR inhibiting indicator is the amount X of data generated by the service and buffered by the communication terminal for future transmission to the base station.

The base station detects that the communication terminal uses a gaming service that most of the times requires 10 kbit/s with a delay requirement of 20 ms. The base station decides to use predictive scheduling of at least 200 bits each 20 ms, since 10 kbit/s times 20 ms equals 200 bits.

The base station then sends a message including a first SR inhibiting indicator which inhibits SR transmission as long as there is less than X=200 bits of data in the UE waiting for transmission e.g. by transmitting a 200 bit grant with the first SR inhibiting indicator (which could e.g. be an SPS grant).

The instantaneous amount of data in a 20 ms interval may be higher than 200 bits, but then an SR is triggered and the base station can react and give the terminal a larger grant before the 20 ms period so that the delay requirement can be kept.

By the present invention, a lower battery consumption for dynamically scheduled UEs when predictive scheduling is used can be obtained. Also, shorter average response times for scheduling requests may be obtained since scheduling requests that do not need immediate response are blocked, hence making it easier to prioritize other scheduling requests.

Below follow other aspects of the present invention.

According to an aspect of the present invention, there is provided a method of an electronic communication base station. The method comprises obtaining information about a service currently used by a communication terminal connected to/associated with the base station. The method further comprises the base station performing predictive scheduling of transmissions from the communication terminal to the base station based on the obtained information. The predictive scheduling includes determining an interval I which is the predicted maximal time period between consecutive transmission grants sent by the base station to the communication terminal. The method further comprises sending a first transmission grant to the communication terminal at the time t=0 in accordance with the predictive scheduling, and sending a first SR inhibiting indicator to the communication terminal, preventing the communication terminal from sending a Scheduling Request (SR) to the base station unless a specified criterion is fulfilled. The method further comprises sending a second transmission grant to the communication terminal at the latest at the time t=I.

The first transmission grant and the SR inhibiting indicator may be sent to the communication terminal as parts of the same first grant message, e.g. an SPS grant message.

The predictive scheduling may further include determining a transmission size X which is the predicted maximum amount of data generated by the service and buffered at the communication terminal for transmission to the base station during the time interval I, and including in the first transmission grant the transmission size X. The transmission size X may be the same size as the transmission size allowed by said first transmission grant.

The specified criterion may be that the time t equals I or that the time t equals a specific time which exceeds I and/or the amount of data buffered for transmission to the base station equals or exceeds X of the first transmission grant and/or that data associated with a certain logical channel arrives to the communication terminal for transmission to the base station.

The method may further comprise sending a second SR inhibiting indicator to the communication terminal, optionally as a part of the same message as the second transmission grant or a later transmission grant. The second SR inhibiting indicator and the second transmission grant, or a later transmission grant, may be sent to the communication terminal as parts of the same grant message, e.g. an SPS grant message.

According to another aspect of the present invention, there is provided a base station. The base station comprises an information obtaining module with circuitry configured for obtaining information about a service currently used by a communication terminal connected to/associated with the base station. The base station further comprises a processing unit with circuitry configured for performing predictive scheduling of transmissions from the communication terminal to the base station based on the obtained information. The predictive scheduling includes determining an interval I which is the predicted maximal time period between consecutive transmission grants sent by the base station to the communication terminal. The base station further comprises a transmitter configured to send a first transmission grant to the communication terminal at the time t=0 in accordance with the predictive scheduling, and to send a first SR inhibiting indicator to the communication terminal, preventing the communication terminal from sending a Scheduling Request (SR) to the base station unless a specified criterion is fulfilled. The transmitter being further configured to send a second transmission grant to the communication terminal at the latest at the time t=I.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of scheduling of an electronic communication base station, the method comprising:
    obtaining information about a service currently used by a communication terminal associated with the base station;
    performing predictive scheduling of transmissions from the communication terminal to the base station based on the obtained information, the predictive scheduling including determining an interval I which is a predicted maximal time period between consecutive transmission grants sent by the base station to the communication terminal;
    sending a first transmission grant to the communication terminal at a first time t=0 in accordance with the predictive scheduling;
    sending a first Scheduling Request (SR) inhibiting indicator to the communication terminal, preventing the communication terminal from sending a Scheduling Request, SR, to the base station unless a specified criterion is fulfilled; and
    sending a second transmission grant to the communication terminal at the latest at a second time t=I;
    wherein the first transmission grant and the first SR inhibiting indicator are sent to the communication terminal together as parts of a first grant message.

2. The method of claim 1, wherein the first grant message is a semi-persistent scheduling, SPS, grant message.

3. The method of claim 2, wherein the SPS grant message comprises an SPS interval which is at least as long as the predicted time interval I.

4. The method of claim 2, wherein the SPS grant message comprises an SPS interval which is the longest SPS interval allowed by a communication standard used for communication between the base station and the communication terminal.

5. The method of claim 1, wherein the predictive scheduling further includes determining a transmission size X which is the predicted maximum amount of data generated by the service and buffered at the communication terminal for transmission to the base station during the time interval I, and including said transmission size X in the first transmission grant.

6. The method of claim 5, wherein the specified criterion is one of the following:
    the time t equals I;
    the time t equals a specified time which exceeds I;
    the amount of data buffered for transmission to the base station equals or exceeds X; and
    data associated with a certain logical channel has arrived to the communication terminal for transmission to the base station.

7. The method of claim 1, wherein the first SR inhibiting indicator needs to be replaced within a limited time period, the method further comprising:
    sending a second SR inhibiting indicator to the communication terminal prior to expiry of the limited time period.

8. An electronic communication base station comprising:
    an information obtaining module with circuitry configured for obtaining information about a service currently used by a communication terminal associated with the base station;
    a processing unit with circuitry configured for performing predictive scheduling of transmissions from the communication terminal to the base station based on the obtained information, the predictive scheduling including determining an interval I which is a predicted maximal time period between consecutive transmission grants sent by the base station to the communication terminal; and
    a transmitter configured for sending a first transmission grant to the communication terminal at a first time t=0 in accordance with the predictive scheduling, for sending a first Scheduling Request (SR) inhibiting indicator to the communication terminal, preventing the communication terminal from sending a Scheduling Request, SR, to the base station unless a specified criterion is fulfilled, and for sending a second transmission grant to the communication terminal at the latest at a second time t=I;
    wherein the transmitter is configured to send the first transmission grant and the first SR inhibiting indicator to the communication terminal together as parts of a first grant message.

9. The electronic communication base station of claim 8, wherein the first grant message is a semi-persistent scheduling, SPS, grant message.

10. The electronic communication base station of claim 9, wherein said base station is configured for setting an SPS interval of the SPS grant message to a time period which is at least as long as the predicted time interval I.

11. The electronic communication base station of claim 9, wherein said base station is configured for setting an SPS interval of the SPS grant message to a time period which is the longest SPS interval allowed by a communication standard used for communication between the base station and the communication terminal.

12. The electronic communication base station of claim 8, wherein the processing unit further comprises circuitry configured for determining a transmission size X which is the predicted maximum amount of data generated by the service and buffered at the communication terminal for transmission to the base station during the time interval I, and including said transmission size X in the first transmission grant.

13. The electronic communication base station of claim 12, wherein the specified criterion is one of the following:
    the time t equals I;
    the time t equals a specified time which exceeds I;
    the amount of data buffered for transmission to the base station equals or exceeds X; and
    data associated with a certain logical channel has arrived to the communication terminal for transmission to the base station.

14. The electronic communication base station of claim 8, wherein the transmitter is further configured for sending a second SR inhibiting indicator to the communication terminal prior to expiry of a limited time period within which the first SR inhibiting indicator needs to be replaced.

15. A communication system comprising:
a communication terminal; and
an electronic communication base station comprising:
an information obtaining module with circuitry configured for obtaining information about a service currently used by the communication terminal;
a processing unit with circuitry configured for performing predictive scheduling of transmissions from the communication terminal to the base station based on the obtained information, the predictive scheduling including determining an interval I which is a predicted maximal time period between consecutive transmission grants sent by the base station to the communication terminal; and
a transmitter configured for sending a first transmission grant to the communication terminal at a first time $t=0$ in accordance with the predictive scheduling, for sending a first Scheduling Request (SR) inhibiting indicator to the communication terminal, preventing the communication terminal from sending a Scheduling Request, SR, to the base station unless a specified criterion is fulfilled, and for sending a second transmission grant to the communication terminal at the latest at a second time $t=I$;
wherein the transmitter is configured to send the first transmission grant and the first SR inhibiting indicator to the communication terminal together as parts of a first grant message.

16. A computer program product stored in a non-transitory computer readable medium for controlling an electronic communication base station, the computer program product comprising software instructions which, when run on the base station, causes the base station to:
obtain information about a service currently used by a communication terminal associated with the base station;
perform predictive scheduling of transmissions from the communication terminal to the base station based on the obtained information, the predictive scheduling including determining an interval I which is a predicted maximal time period between consecutive transmission grants sent by the base station to the communication terminal;
send a first transmission grant to the communication terminal at a first time $t=0$ in accordance with the predictive scheduling;
send a first Scheduling Request (SR) inhibiting indicator to the communication terminal, preventing the communication terminal from sending a Scheduling Request, SR, to the base station unless a specified criterion is fulfilled; and
send a second transmission grant to the communication terminal at the latest at a second time $t=I$;
wherein the first transmission grant and the first SR inhibiting indicator are sent to the communication terminal together as parts of a first grant message.

* * * * *